United States Patent [19]

Garman et al.

[11] Patent Number: 5,425,129
[45] Date of Patent: Jun. 13, 1995

[54] METHOD FOR WORD SPOTTING IN CONTINUOUS SPEECH

[75] Inventors: Joseph H. Garman, Washington, D.C.; Alice G. Klein, Potomac; Vincent M. Stanford, Gaithersburg, both of Md.

[73] Assignee: International Business Machines Corporation, Armonk, N.Y.

[21] Appl. No.: 968,097

[22] Filed: Oct. 29, 1992

[51] Int. Cl.$^6$ .............................................. G10L 5/06
[52] U.S. Cl. ................................................. 395/2.65
[58] Field of Search ........................ 381/43, 41–43; 395/2, 2.6–2.66, 2.56–2.59

[56] References Cited

U.S. PATENT DOCUMENTS

| | | | |
|---|---|---|---|
| 4,069,393 | 1/1978 | Martin et al. | 381/43 |
| 4,087,630 | 5/1978 | Browning et al. | 395/2.45 |
| 4,144,582 | 3/1979 | Hyatt | 395/2.12 |
| 4,461,024 | 7/1984 | Rengger et al. | 381/46 |
| 4,481,593 | 11/1984 | Bahler | 381/43 |
| 4,489,435 | 12/1984 | Moshier | 381/43 |
| 4,718,088 | 1/1988 | Baker et al. | 381/43 |
| 4,720,802 | 1/1988 | Damoulakis et al. | 381/43 |
| 4,783,803 | 11/1988 | Baker et al. | 381/42 |
| 4,805,218 | 2/1989 | Bamberg et al. | 381/43 |
| 4,829,572 | 5/1989 | Kong | 381/41 |
| 4,856,066 | 8/1989 | Lemelson | 381/36 |
| 4,897,878 | 1/1990 | Boll et al. | 381/43 |
| 4,905,286 | 2/1990 | Sedgwick et al. | 381/43 |
| 4,922,538 | 5/1990 | Tchorzewski | 381/42 |
| 4,933,973 | 6/1990 | Porter | 381/43 |
| 5,027,406 | 6/1991 | Roberts et al. | 381/43 |
| 5,036,538 | 7/1991 | Oken et al. | 381/43 |
| 5,170,432 | 12/1992 | Hackbarth et al. | 381/43 |

FOREIGN PATENT DOCUMENTS 215573 8/1986 European Pat. Off. .

OTHER PUBLICATIONS

Marcus et al., "A Variable Duration Acoustic HMM for Hard-To-Recognize Words And Phrases," IEEE/ICASSP, 14–17 May 1991, pp. 281–284.
Lee et al., "Corrective and Reinforcement Learning for Speaker Independent Continuous Speech Recognition", Computer and Language, 199, pp. 1–21.
Chris Rowden, "Speech Processing", McGraw-Hill, 1992, pp. 246–247.
IEEE Article by K. F. Lee & H. W. Hon, "Large Vocabulary Speaker Independent (CH2561-9/88/ Continuous Speech Recognition Using HMM," 1988, pp. 123–126, 00000–0123).

Primary Examiner—David D. Knepper
Attorney, Agent, or Firm—Martin J. McKinley

[57] ABSTRACT

A digitized speech data channel is analyzes for the presence of words or phrases from a desired list. If the word is not present the speech time series from the channel, there is a high probability of matching the input data to phonemic noise markers rather than to word models. This is accomplished through the use of a competitive algorithm wherein Hidden Markov Models (HMMs) of the desired words or phrases compete with an alternative HMM of a set of phonemes. The set of phonemes can be chosen in order to reduce the computer resources required for the channel analysis.

8 Claims, 2 Drawing Sheets

METHOD FOR WORD SPOTTING IN CONTINUOUS SPEECH

BACKGROUND OF THE INVENTION

This invention is implemented in the context of the IBM Continuous Speech Recognition System (ICSRS) described in the co-pending U.S. patent application Ser. No. 07/948,031, filed Sep. 21, 1992 by V.M. Stanford, et. al. entitled "Telephony Channel Simulator for Speech Recognition Application", assigned to IBM Corporation, and incorporated herein by reference.

The System is further disclosed in the co-pending U.S. patent application Ser. No. 07/947,634, filed Sep. 21, 1992 by V.M. Stanford, et. al. entitled "Instantaneous Context Switching for Speech Recognition Systems", assigned to IBM Corporation, and incorporated herein by reference.

Much of the terminology described is defined in detail therein. It is to be emphasized that only one preferred embodiment is implemented in this system, but the principles of the invention will apply to a variety of hidden Markon Modelling or HMM-based speech recognition implementations using word, or phrase, models to compete with sub-word models in the analysis of a continuous speech data stream. Also, while the method has been shown to execute using less computation with the reduced phoneme set as sub-word models described below, algorithms using larger, or smaller, phoneme sets, or other sub-word models are anticipated by this invention.

PRIOR ART SPEECH RECOGNITION SYSTEMS

This Word Spotting Technique is novel relative to the prior art in that it will allow the recognition search to conclude that no full-word model has achieved enough probability in the search process to reasonably account for the observed speech data. Prior recognition algorithms would produce a best match to the speech data channel, from a set of word models guided by word-pair, bigram, trigram, finite-state or other grammars, with the observed speech data, even in the event that the match was poor.

OBJECTS OF THE INVENTION

It is the object of the invention to provide a speech recognition system with word spotting capability, which allows the detection of indicated words or phrases in the presence of unrelated phonetic data.

SUMMARY OF THE INVENTION

By allowing sub-word models to match the input data when the word models match the input data poorly, we allow desired words to be spotted in the context of unrelated speech without forcing the search to recognize the specified words when there is only unrelated speech present.

If one or more of the desired words or phrases are detected, the output string, as shown in FIG. 1, will contain the string for the detected word, possibly in addition to sub-word markers for the portions of the input not containing the indicated word or words. If the output string contains only sub-word model markers, we can conclude that there was speech not containing any of the desired words.

It is also novel in that it employs silence-coarticulated HMM phoneme models to compete with coarticulated HMM triphone-based word models to detect specific words, or phrases, in the presence of unrelated general spoken language. The coarticulation modeling of the triphones described in an article entitled "Large Vocabulary Speaker Independent Continuous Speech Recognition; V. Sphinx System"; K. Lee, Carnegie Mellon University, Department of Electrical & Computer Engineering, April 1988; CMU-CS-88-148, in general, make the word spotting models more specific than the alternative phoneme-based sub-word models. This effect is the basis of the invention, in that it will, with high probability, match the word models to their corresponding speech data rather than accounting for the desired words with sub-word phone models.

The sub-word phoneme models are entered into spotting grammars using a simple grammatical technique as follows:

The word spouting BNF 136, is as follows: <phonestring> ::= <phoneme> || <phoneme> <phoneme>
<utterance> ::= <word> || <word> <phonestring> || <phonestring> <word> ||
<phonestring> <word> <phonestring>.

The phoneme grammar 158, is as follows:

<phone> ::= $iy \parallel ih \parallel eh \parallel ae \parallel ix \parallel ax \parallel ah \parallel uw \parallel uh$
$\parallel ao \parallel aa \parallel ey \parallel ay \parallel oy \parallel aw \parallel ow \parallel l \parallel r$
$\parallel y \parallel w \parallel er \parallel en \parallel m \parallel n \parallel ng \parallel ch \parallel jh$
$\parallel dh \parallel b \parallel d \parallel g \parallel p \parallel t \parallel k \parallel z \parallel v \parallel f$
$\parallel th \parallel s \parallel sh \parallel hh \parallel dd \parallel pd \parallel td \parallel kd \parallel dx \parallel ts$
$\parallel sil$ The words to be spotted in 136 (See FIG. 2), are as follows:
<word> ::= WORD1 || WORD2- || WORD3 || ... || ... || ... || WORDN.

Where WORD1,..., WORDN comprise the spotting list

It is to be noted that the strict Backus-Normal Form (BNF) grammar given above will not allow an unlimited length phoneme string to be matched either preceding, or following the words in the spotting list.

However, the ICSRS derives a word-pair, or bigram, grammar from the given BNF which is used in subsequent recognition. This grammar is constructed by building a list of all of the words, or in this case words and phonemes, in the grammar. Each of these words (or phonemes) has attached a sublist of words or phonemes that can follow. Thus, the BNF grammar is reduced to a probabilistic transition matrix on the HMM modeling units, formerly word models, but in the context of this invention, to include both word, and sub-word models.

The word pair grammar is then used to guide the recognition search, which proceeds while there is sufficient data to drive analysis.

This is accomplished by creating alternative grammatical hypotheses for the spotting-list word models and sub-word models. They are evaluated in parallel, with those having the highest probability being chosen to represent appropriate speech segments. Thus, the word spotting problem is reduced to testing the hypothesis that a given text segment is best represented by a set of sub-word HMM monosyllable words versus the hypothesis that it is best represented by any of the words or phrases in the word/phrase spotting list.

DISCUSSION OF THE PREFERRED EMBODIMENT

A significant improvement in run time efficiency can be achieved by reducing the perplexity of the sub-word, or phone transition matrix using a sub-word model analyzer 134 and a full-word model analyzer 106. This was accomplished by:

1) Using a transition probability matrix which augments the word pairs with probabilities for the individual phone-to-phone, and/or word-to-word transition probabilities. The word pair grammar, with transition probabilities is referred to as a bigram, as mentioned above.

2) Using a reduced set of phonemes for matching in order to reduce the specificity of the sub-word models further below that of the word models, and to reduce the search space required for finding the optimal sub-word model probabilities for comparison with word model probabilities.

The probability transition matrix was calculated by performing a bigram analysis on the lexicon of English words, and their sub-word phoneme representation. The reduced set of phonemes was carefully chosen to adequately cover the various phonetic features found in the speech signal with the minimum number of symbols.

The final set has six phonemes,/S,T,N,UW,IY,AA/in addition to the word separator,/!/.

The probability transition matrix and reduced phone set decreased recognition time by a factor of five, with little or no reduction in accuracy. The reduced phone set is described below.

/S/ was used to replace all continent pure-consonants.
These are:/HH,S,Z,SH,F,V,TH,DH/
/T/ was used to replace all discontinuant pure-consonants.
These are: /CH,JH,TS,P,PD,B,T,TD,D,K,KD,G,DD,DX/
/N/ was used to replace all vocalic consonants.
These are:/M,N,NG,R,L,EN,ER/
/UW/ was used to replace all high-back or rounded vocalic elements.
These are:/W,UW,OW,UH,AW/
/IY/ was used to replace all high-front vocalic elements.
These are:/Y,IY,EY,IH,EH,IX,OY,AY/
/AA/ was used to replace all low vocalic elements.
These are:/AE,AA,AO,AH,AX/

Since the coarticulated-triphone sequence word models provide a stronger pattern-matching capability for the actual modeled words and phrases than the competing non-coarticulated phone-based models, they are able to overcome the base phone models when the spotted words are actually present.

For example, a spotting word such as "computer" would be represented as a concatenated triphone sequence as follows:

K(sil,ax), AX(k,m), M(ax,p), P(m,y), Y(p,uw), UW(y,dx), DX(uw,er), ER(dx,sil).

The preferred embodiment of this technique employs a Viterbi beam of the HMMs for sub-word and word model search, using non-coarticulated sub-word models and coarticulated word models which identify parts of the voice data stream which do not match words and phrases from the spotting list. Another embodiment described in a publication entitled "A Maximum Likelihood Approach to Continuous Speech Recognition"; L. Bahl, et al.; Readings in Speech Recognition; Ed.: A. Waibel et al.; 1990; pages 308–319 employs an A* (read A-Star) search for the evaluation of the word, and sub-word HMMs.

Figure 1:
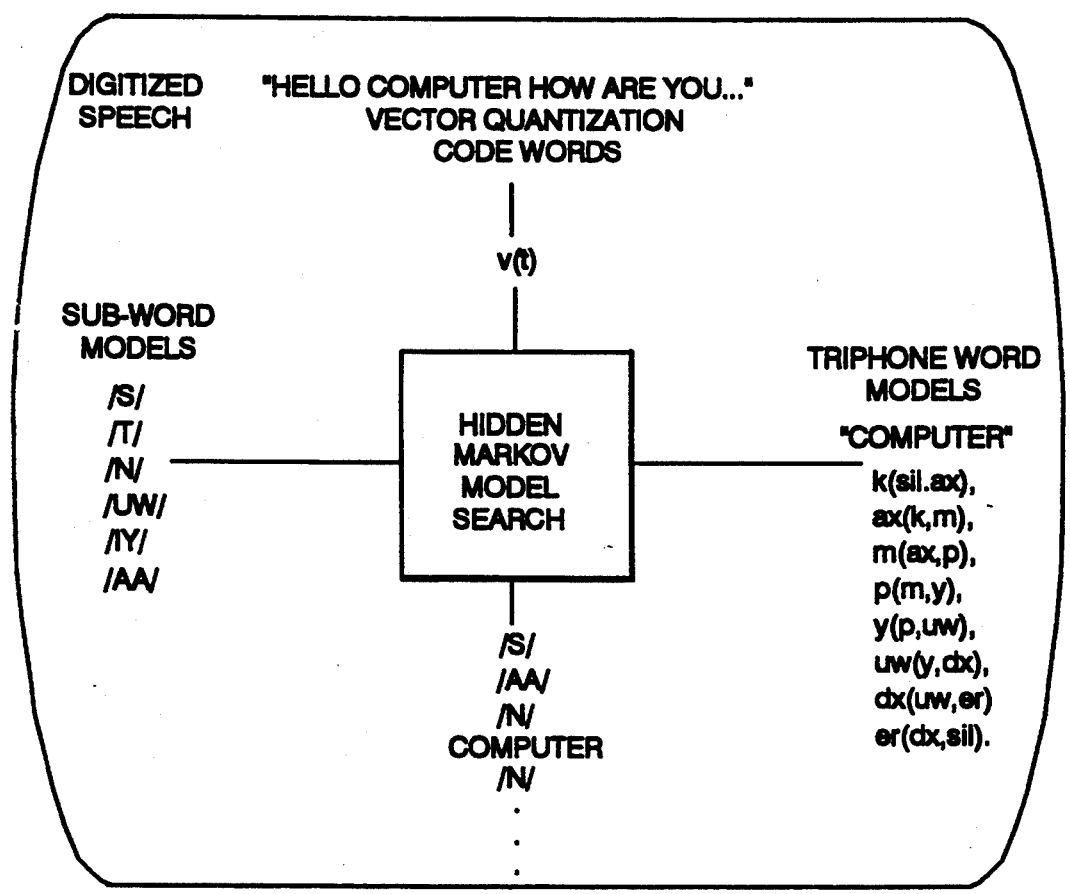
FIG. 1 is a representation of the word spotting invention. It is noted that the box comprising FIG. 1 corresponds to block 106 of FIG. 1 of U.S. patent application Ser. No. 07/948,031, filed Sep. 21, 1992 by V.M. Stanford, et. al. entitled "Telephony Channel Simulator for Speech Recognition Application", assigned to IBM Corporation. A similar figure is included here for the convenience of the reader, in FIG. 2 which is a block diagram of the invention.
Figure 2:
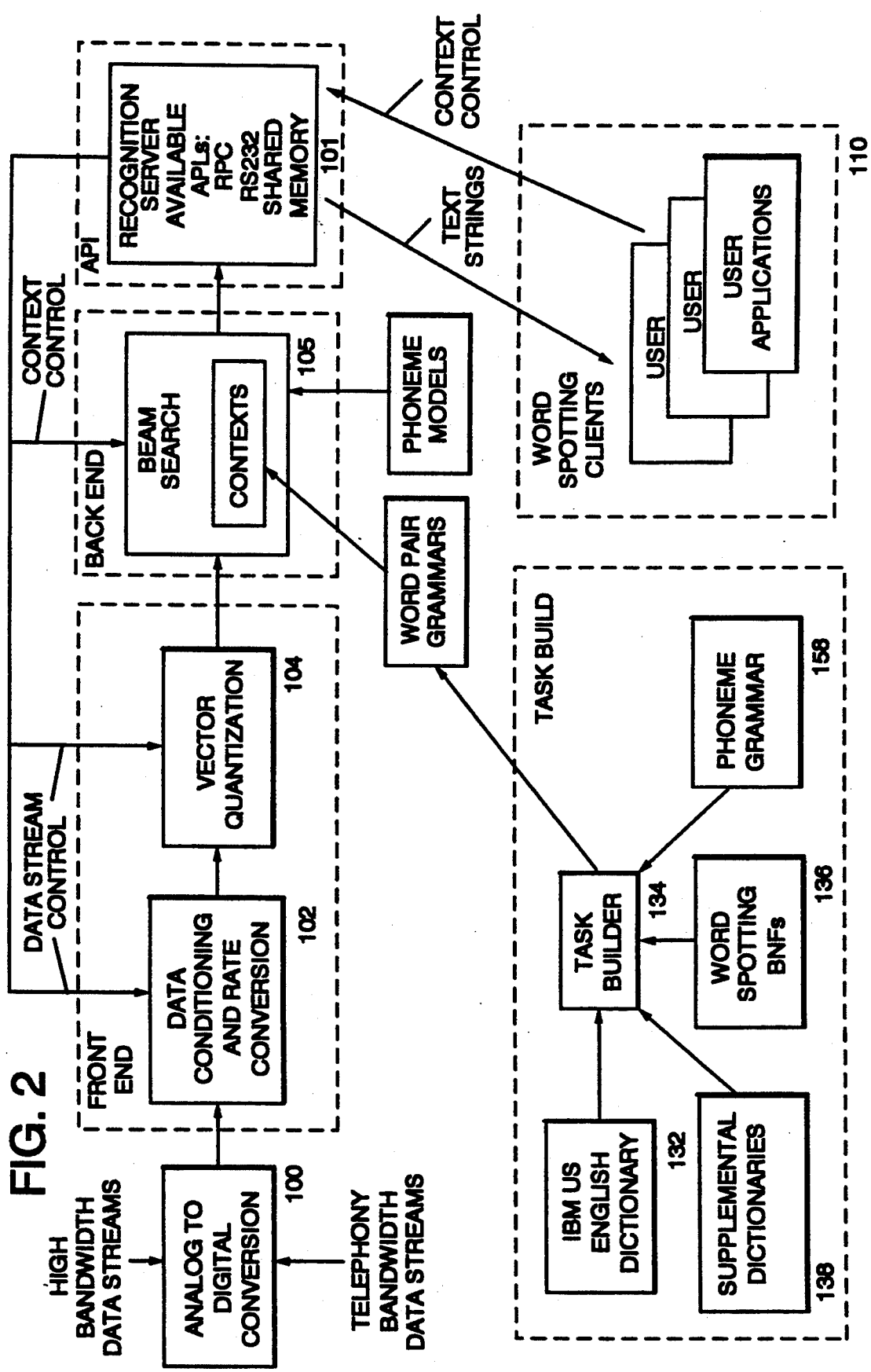

The insertion penalty normally employed for general English word searches is reduced by about a factor of 2.0 to about 0.25 from its default value of 0.5 as described in the K. Lee publication, supra. An example search by the method of this invention is shown in FIG. 1.

Although a specific embodiment of the invention has been disclosed, changes can be made to that embodiment without departing from the spirit and the scope of the invention.

What is claimed is:

1. In a speech recognition system, a subsystem for spotting pre-specified words, comprising:
   a sub-word model analyzer using context independent phoneme models and having an input connected to a source of continuous speech;
   a full-word model analyzer using triphone based models which may coincide with the context independent phoneme models, the full-word model analyzer [and]having an input connected to said source of continuous speech;
   said sub-word model analyzer having a first threshold output signal indicative of the presence of one or more said phoneme models;
   said full-word model analyzer having a second threshold indicative of the probability of the presence of a pre-specified word, represented by a triphone based model; and
   a pre-specified word detecting means having an input coupled to said sub-word model analyzer, for receiving said first threshold output, and coupled to said full-word model analyzer, for receiving said second threshold, and in response thereto, identifying a pre-specified word to be spotted, provided the probability of the presence of the pre-specified word, represented as a triphone model is greater than the probability of the presence of the phoneme model.

2. The system of claim 1 wherein a reduced set of phoneme models is used to achieve improved run time efficiency for the system.

3. The system of claim 2 wherein the reduced set of phoneme comprises: /S/,/T/,/N/,/UW/,/IY/,/AA/, and /!/.

4. The system of claim 3 wherein the identification of a prespecified word activates a voice-operated computer, which in the absence of such identification, remains in a quiescent state.

5. In a speech recognition system, a method for spotting pre-specified words, comprising the steps of:
- analyzing with a sub-word model analyzer using context independent phoneme models, a source of continuous speech;
- analyzing with a full-word model analyzer using triphone based models which may coincide with the context independent phoneme models, said source of continuous speech;
- providing from said sub-word model analyzer a first threshold output signal indicative of the presence of one or more said phoneme models;
- providing from said full-word model analyzer a second threshold output signal indicative of the probability of the presence of a pre-specified word, represented by a triphone based model;
- detecting a pre-specified word with a pre-specified word detecting means, having an input coupled to said sub-word model analyzer, for receiving said first threshold signal, and coupled to said full-word model analyzer, for receiving said second threshold signal; and
- identifying a pre-specified word in said source of continuous speech, provided the probability of the presence of the prespecified word is greater than the probability of the presence of the phoneme model.

6. The method of claim 5 wherein the step of analyzing with a sub-word analyzer uses a reduced set of phoneme models to achieve improved run time efficiency for the method.

7. The method of claim 6 wherein the reduced set of phonemes comprises: /S/,/T/,/N/,/UW/,/IY/,/AA/, and /!/.

8. The method of claim 7 wherein the step of identifying a pre-specified word activates a voice-operated computer, which in the absence of such identification, remains in a quiescent state.

* * * * *